(12) United States Patent
Desai et al.

(10) Patent No.: US 10,284,760 B2
(45) Date of Patent: May 7, 2019

(54) CONTINUOUS VIDEO CAPTURE DURING SWITCH BETWEEN VIDEO CAPTURE DEVICES

(71) Applicant: Samsung Electronics Co., Ltd., Suwon-si, Gyeonggi-do (KR)

(72) Inventors: Prashant Desai, San Francisco, CA (US); Jesse Alvarez, Oakland, CA (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 337 days.

(21) Appl. No.: 15/074,237

(22) Filed: Mar. 18, 2016

(65) Prior Publication Data

US 2016/0205302 A1    Jul. 14, 2016

Related U.S. Application Data

(63) Continuation of application No. 13/803,885, filed on Mar. 14, 2013, now Pat. No. 9,325,889.

(60) Provisional application No. 61/657,630, filed on Jun. 8, 2012.

(51) Int. Cl.
*H04N 5/76* (2006.01)
*H04N 5/225* (2006.01)
*H04N 5/232* (2006.01)
*H04N 5/262* (2006.01)

(52) U.S. Cl.
CPC ....... *H04N 5/2258* (2013.01); *H04N 5/23238* (2013.01); *H04N 5/23245* (2013.01); *H04N 5/76* (2013.01); *H04N 5/23293* (2013.01); *H04N 5/2621* (2013.01)

(58) Field of Classification Search
CPC ............ H04N 5/2258; H04N 5/23238; H04N 5/2621; H04N 5/23293
See application file for complete search history.

(56) References Cited

U.S. PATENT DOCUMENTS

| 7,444,664 B2 | 10/2008 | Lou et al. |
| 7,492,386 B2 | 2/2009 | Nichols et al. |
| 7,583,316 B2 | 9/2009 | Miyashita et al. |

(Continued)

FOREIGN PATENT DOCUMENTS

| EP | 1560421 A1 | 8/2005 |
| EP | 1441522 B1 | 4/2006 |

(Continued)

OTHER PUBLICATIONS

International Search Report and Written Opinion dated Oct. 21, 2013 for International Application No. PCT/KR2013/004944 from Korean Intellectual Property Office, pp. 1-11, Seo-gu, Daejon, Republic of Korea.

(Continued)

*Primary Examiner* — Jason A Flohre
(74) *Attorney, Agent, or Firm* — Sherman IP LLP; Kenneth L. Sherman; Steven Laut (57) ABSTRACT

A method provides capturing video information in an electronic device. Capturing video information comprises capturing video, using a first video capture device of the electronic device, switching video capture between the first video capture device and a second video capture device of the electronic device, and continuing video capture while switching between the first video capture device and the second video capture device.

14 Claims, 9 Drawing Sheets

(56) References Cited

U.S. PATENT DOCUMENTS

| | | | |
|---|---|---|---|
| 8,451,312 | B2 | 5/2013 | Lee et al. |
| 8,744,420 | B2 | 6/2014 | Cranfill et al. |
| 8,941,706 | B2 | 1/2015 | Guo et al. |
| 2002/0164567 | A1 | 11/2002 | Katayama |
| 2003/0026611 | A1 | 2/2003 | Cho |
| 2004/0145675 | A1* | 7/2004 | Kitada ............... H04N 5/2256 348/371 |
| 2004/0189851 | A1 | 9/2004 | Son et al. |
| 2004/0208493 | A1* | 10/2004 | Kashiwa ............ H04N 5/2251 386/207 |
| 2005/0140812 | A1 | 6/2005 | Yoo et al. |
| 2006/0044396 | A1* | 3/2006 | Miyashita .......... H04N 5/2252 348/207.99 |
| 2006/0139463 | A1* | 6/2006 | Heinonen .......... H04N 5/2251 348/239 |
| 2007/0263079 | A1 | 11/2007 | Graham et al. |
| 2007/0279482 | A1 | 12/2007 | Oswald |
| 2008/0034278 | A1 | 2/2008 | Tsou |
| 2009/0202223 | A1 | 8/2009 | Saito |
| 2009/0232129 | A1 | 9/2009 | Wong et al. |
| 2010/0053212 | A1* | 3/2010 | Kang ............... H04N 21/23412 345/629 |
| 2010/0157016 | A1 | 6/2010 | Sylvain |
| 2011/0090347 | A1 | 4/2011 | Buckner et al. |
| 2011/0249073 | A1* | 10/2011 | Cranfill ............. H04N 5/2258 348/14.02 |
| 2012/0008011 | A1* | 1/2012 | Garcia Manchado ...................... H04N 5/2253 348/231.2 |
| 2012/0191223 | A1 | 7/2012 | Dharwada et al. |
| 2012/0274808 | A1* | 11/2012 | Chong ............ H04N 5/23293 348/234 |
| 2013/0286250 | A1 | 10/2013 | Kumar et al. |
| 2013/0328997 | A1 | 12/2013 | Desai et al. |

FOREIGN PATENT DOCUMENTS

| | | |
|---|---|---|
| JP | 2003298884 A | 10/2003 |
| JP | 2004180107 A | 6/2004 |
| JP | 2005073161 A | 3/2005 |
| JP | 2007088579 A | 4/2007 |
| JP | 2011250340 A | 12/2011 |
| KR | 1020120048293 A | 5/2002 |
| KR | 100533450 B1 | 2/2006 |
| KR | 1020060021680 A | 3/2006 |
| KR | 1020110129744 A1 | 12/2011 |
| WO | 2006067545 A1 | 6/2006 |

OTHER PUBLICATIONS

Extended European Search Report dated Aug. 21, 2014 for European Application No. 13170796.0 from European Patent Office, pp. 1-9, Munich, Germany.

International Search Report and Written Opinion dated Oct. 22, 2013 for International Application No. PCT/KR2013/005054 from Korean Intellectual Property Office, pp. 1-11.

ITUT-T Telecommunication Standarization SECOTR of ITU, Role management and additional media channels for H.300-series Terminals, H.239, Sep. 13, 2005, International Telecommunication Union, pp. 1-32, Geneva.

European Search Report dated Aug. 16, 2013 for European Application No. 13171018.8 from European Patent Office, pp. 1-8, Berlin, Germany.

U.S. Non-Final Office Action for U.S. Appl. No. 13/803,885 dated Apr. 24, 2014.

U.S. Final Office Action for U.S. Appl. No. 13/803,885 dated Oct. 30, 2014.

U.S. Advisory Action for U.S. Appl. No. 13/803,885 dated Jan. 26, 2015.

U.S. Non-Final Office Action for U.S. Appl. No. 13/803,885 dated Apr. 8, 2015.

U.S. Final Office Action for U.S. Appl. No. 13/803,885 dated Oct. 22, 2015.

U.S. Notice of Allowance for U.S. Appl. No. 13/803,885 dated Dec. 18, 2015.

U.S. Non-Final Office Action for U.S. Appl. No. 13/906,259 dated May 12, 2015.

U.S. Notice of Allowance for U.S. Appl. No. 13/906,259 dated Sep. 15, 2015.

Korean Notice of Allowance dated Jun. 15, 2018 for Korean Patent Application No. 10-2013-00064315 from Korean Patent Office, pp. 1-2, Seoul, South Korea.

* cited by examiner

CONTINUOUS VIDEO CAPTURE DURING SWITCH BETWEEN VIDEO CAPTURE DEVICES

CROSS-REFERENCE TO RELATED APPLICATIONS

This application is a continuation of U.S. Non-Provisional patent application Ser. No. 13/803,885, filed Mar. 14, 2013 which claims the priority benefit of U.S. Provisional Patent Application Ser. No. 61/657,630, filed Jun. 8, 2012, incorporated herein by reference in its entirety.

TECHNICAL FIELD

One or more embodiments relate generally to video capture using mobile electronic devices, and in particular, to continuous video capture during camera switch.

BACKGROUND

With the proliferation of electronic devices such as mobile electronic devices, users increasingly rely on such devices for capturing information of interest to them. Conventionally, when utilizing a mobile imaging product to capture video, the user can only record video from either the front, or rear cameras of the imaging product. The user is unable to switch between the front and rear cameras while continuing to record video, or record from both the front and rear cameras simultaneously.

SUMMARY

One or more embodiments relate generally to capturing video information in an electronic device. One embodiment provides a method comprising capturing video, using a first video capture device of the electronic device. In one embodiment, video capture is switched between the first video capture device and a second video capture device of the electronic device. In one embodiment, video capture is continued while switching between the first video capture device and the second video capture device.

In another embodiment, an electronic device comprises a capture module, comprising: a first video capture device, and a second video capture device. In one embodiment, the capture module is configured to capture video using the first video capture device, and switches video capture between the first video capture device and the second video capture device. In one embodiment, the capture module continues video capture while switching between the first video capture device and the second video capture device.

In another embodiment, a non-transitory computer-readable medium having instructions which when executed on a computer perform a method comprising: capturing video via a first video capture device of the electronic device. In one embodiment, video capture is switched between the first video capture device and a second video capture device of the electronic device. In one embodiment, video capture is continued while switching between the first video capture device and the second video capture device.

In another embodiment, a graphical user interface (GUI) displayed on a display of an electronic device, comprises a first image captured via a first video capture device of the electronic device, wherein the first image is displayed on the display of the electronic device, and a second image captured via a second video capture device of the electronic device, wherein the second image is selectively displayed on the display of the electronic device.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relates generally to utilizing a mobile imaging product, such as mobile electronic device with a video capture device such as, e.g., a camera, to capture video. In one embodiment, a user is allowed to record video from multiple cameras on an electronic device (e.g., front facing camera and rear facing camera of a smartphone). In one embodiment, the user is allowed to switch between the front and rear cameras while continuing to record video and record from both the front and rear cameras simultaneously.

Figure 1:
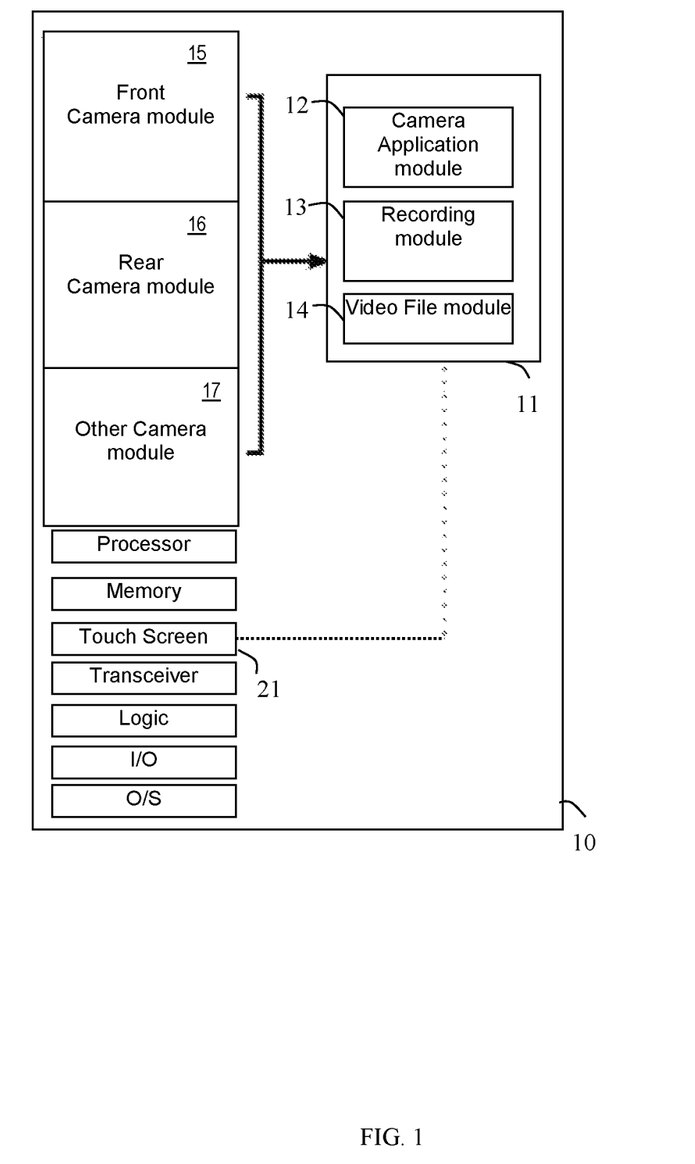
FIG. 1 shows a block diagram of architecture on a system for continuous video capture during camera switch, according to an embodiment.

FIG. 1 shows a block diagram of an embodiment of an electronic device 10 implementing continuous video capture during camera switch, according to an embodiment. The device 10 comprises multiple camera modules, such as a front camera module 15, rear camera module 16, and optionally, one or more other camera modules 17.

In one implementation, the electronic device 10 comprises a smartphone or tablet with a front facing camera that faces a user when the user holds the front face of the camera towards the user, and a rear face camera that points 180 degrees in the opposite direction of the front facing camera.

The electronic device 10 further includes a touch screen 21 for receiving user input and displaying information. The electronic device 10 further includes a processor, memory, transceiver for (wireless) communication, logic, I/O interface and O/S. The electronic device 10 may further include software applications.

The electronic device 10 further includes a capturing module 11 that provides continuous video capture during camera switch, according to an embodiment. The capturing module 11 comprises a camera application module 12, a recording module 13, and a video file module 14.

The camera application module 12 receives video information from the first camera module 15, such as a front facing camera, and/or second camera module 16, such as a rear facing camera, and displays the video information on a touch screen 21.

The recording module 13 allows the user to switch between the front camera 15 and rear camera 16 (and vice versa) while continuing to record video, and record from both the front and rear cameras simultaneously. The video file module 14 provides a storage function of the incoming video in a desired format.

The video capture module 11 allows flexible video capturing that allows a user to capture video from more angles of an event using a mobile device including multiple cameras. The video capture module 11 can further include images of the user in the captured footage as well (e.g., as a narrator that can be seen).

While recording video with the front or rear camera, the user can switch to the other camera without stopping recording by swiping right to left on the touch screen 21 in live capture view. Video output is one continuous clip, even if cameras are switched during recording.

A user has the ability to record both front and rear camera video input simultaneously. An output file allows user to simply tap (or click) to select which recorded feed they would like to maximize.

Figure 2A:
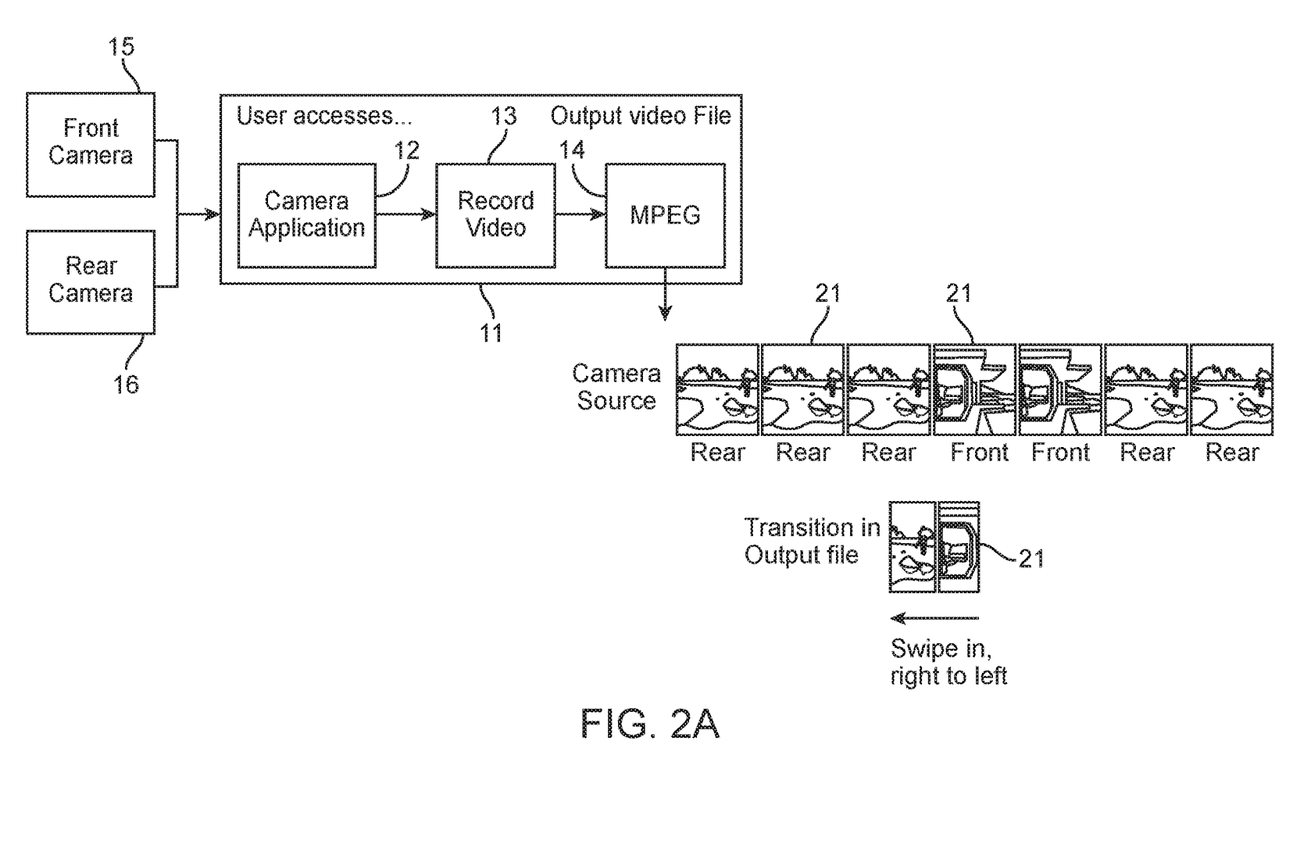
FIG. 2A shows a functional block diagram of a capturing module for continuous video capture during camera switch, according to an embodiment.

FIG. 2A shows a functional block diagram of the capture module 11, according to a one embodiment. The capture module 11 allows a user to record video from multiple cameras on the electronic device 10 (e.g., front facing camera 15 and rear facing camera 16). In one embodiment, the capture module 11 allows the user to switch between the front camera 15 and rear camera 16 while continuing to record video.

In one example, the user first selects the rear camera 16 via the capture module 11 to capture video. While the capture continues, the user selects (activates) the front camera 15 via the capture module 11 to capture video (i.e., switches from capturing from the rear camera 16 to capturing from the front camera 15 only).

The capture module 11 continues to record video during the camera switch and captures video from the front camera 15, instead of the rear camera 16. The capture module 11 provides the user with the ability (e.g., via control icons on the touch screen 21) to select a camera from which to capture video, and to switch between the cameras as desired while continuing capturing video from the selected camera. In one embodiment, capturing video further includes recording the captured video.

Figure 2B:
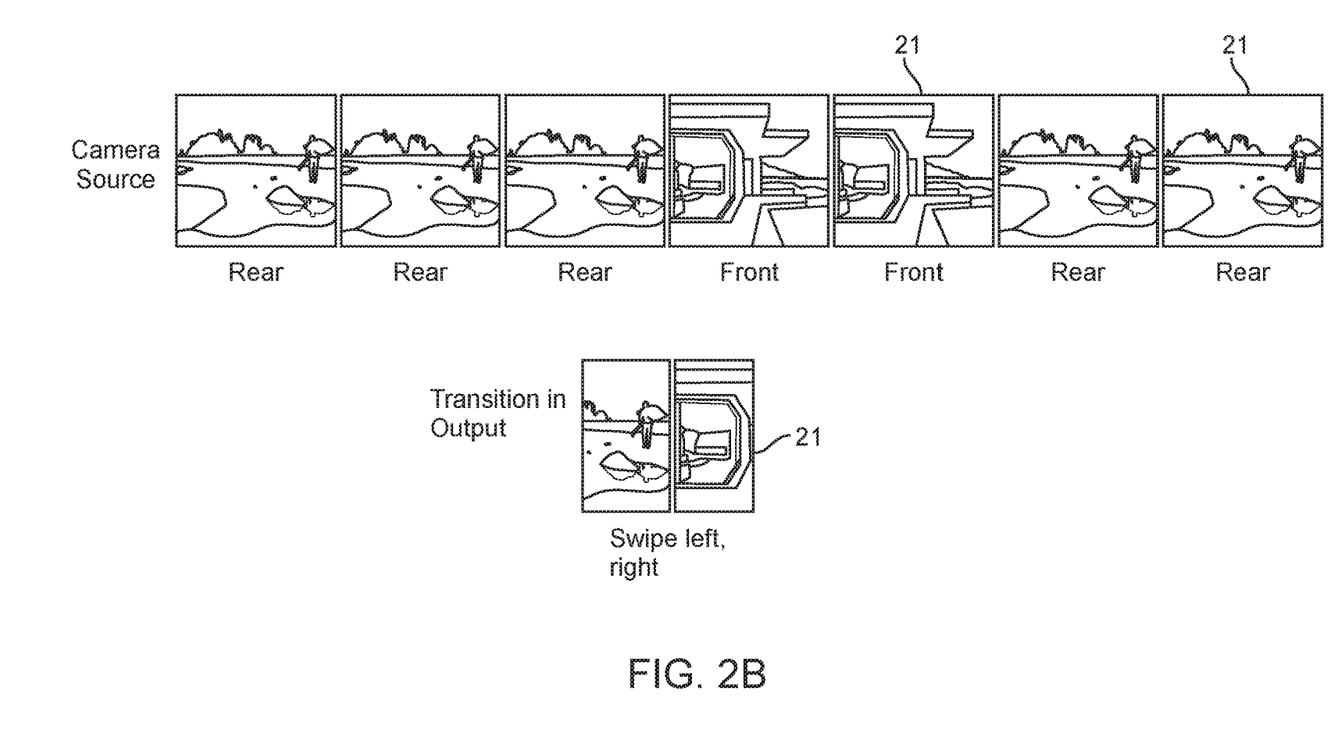
FIG. 2B shows example camera source output for continuous video capture during camera switch in FIG. 2A, according to an embodiment.

As shown in FIG. 2A, the camera source capture output displayed on the touch screen 21 comprises a video clip from the rear camera 16, then from the front camera 15, and then back to the rear camera 16 again as the user switches between the cameras, without breaks and including continuous sound. FIG. 2B shows the camera source output on the touch screen 21 in more detail.

Figure 3:
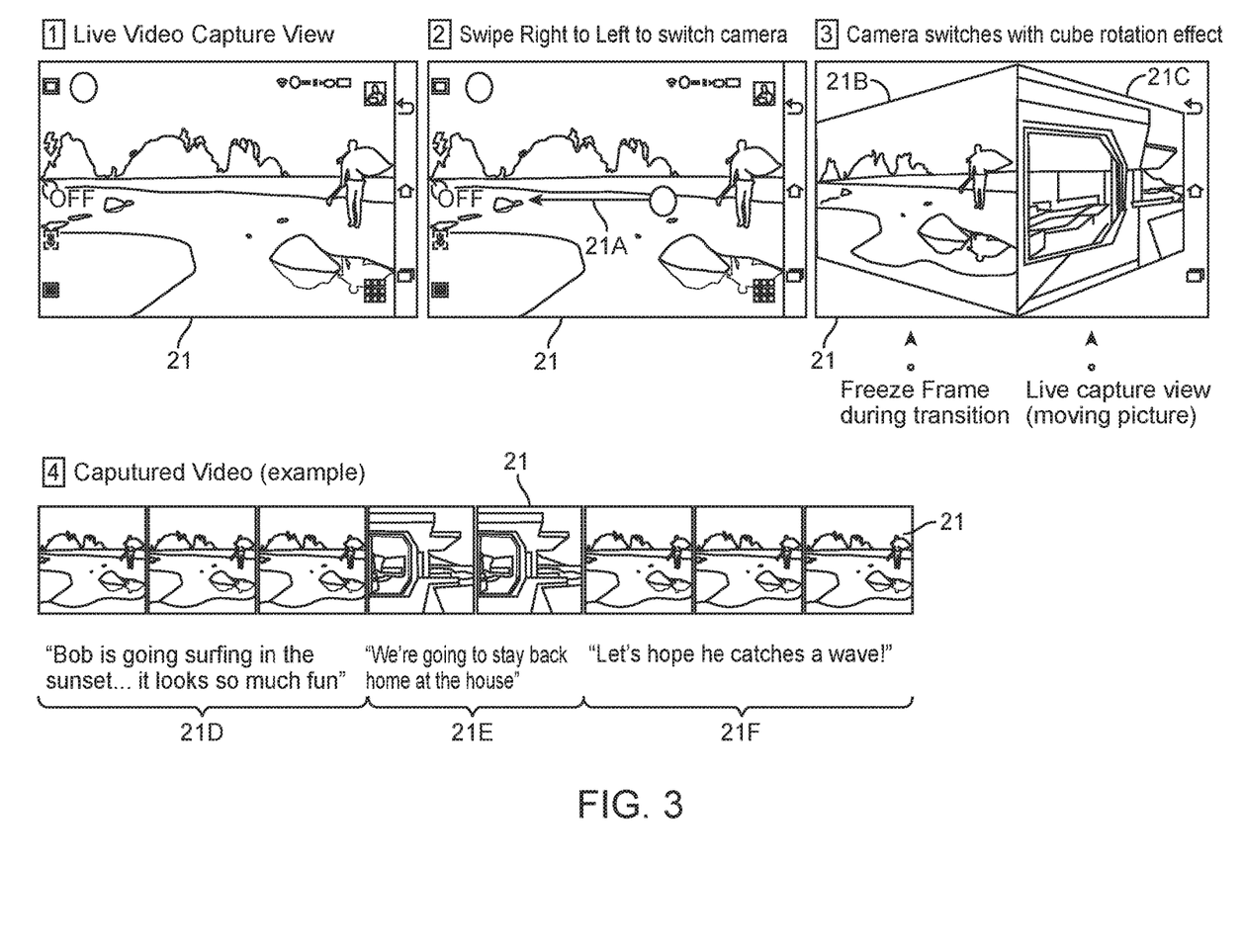
FIG. 3 shows an example process for the video information display by a capturing module in FIG. 2A, according to an embodiment.

FIG. 3 shows an example process for the video information display on the touch screen 21 of the device 10 by the capture module 11, according to an embodiment. Screenshot 1 shows a live video capture view from a first camera on the device 10. Screenshot 2 shows a user selection action, such as a gesture on the touch screen 21, as swiping right to left, as indicated by the arrow 21A, to switch from the first camera to a second camera on the device 10.

Screenshot 3 illustrates video output on touch screen 21 indicating camera switches, using a cube rotation effect when switching from the video 21B from the first camera to the video 21C from the second camera. A left side of the touch screen 21 shows video from the first camera with freeze frame during camera switching transition, and a right side of the screen shows video from the second camera with live capture view (moving picture).

Screenshot 4 illustrates playback of recorded video in the event that a camera switch took place during recording (no simultaneous recording). Images 21D depict playback from front camera recording, images 21E depict playback from rear camera recording after camera switch gesture, and images 21F depicts playback from front camera recording after camera switch gesture is used once again.

For example, screenshot 4 shows a captured video example, wherein images 21D from a rear camera relate to "Bob is going surfing in the sunset . . . it looks so much fun". Images 21E from a front camera relate to "We're going to stay back home at the house". Images 21F relate to "Let's hope he catches a wave!" from the rear camera again.

In another implementation, the user first selects the rear camera for recording video therefrom, and while the recording continues, the user selects (activates) the front camera (i.e., switches from recording from the rear camera only to recording from both the rear camera and front camera).

The capture module 11 continues to record video and now records video from the front camera and the rear camera at the same time. The capture module 11 provides the user with the ability (e.g., via control icons on the display screen 21) to select both cameras from which to record, and to switch between the cameras as desired. The capture comprises simultaneous recording of the video from both cameras.

Figure 4A:
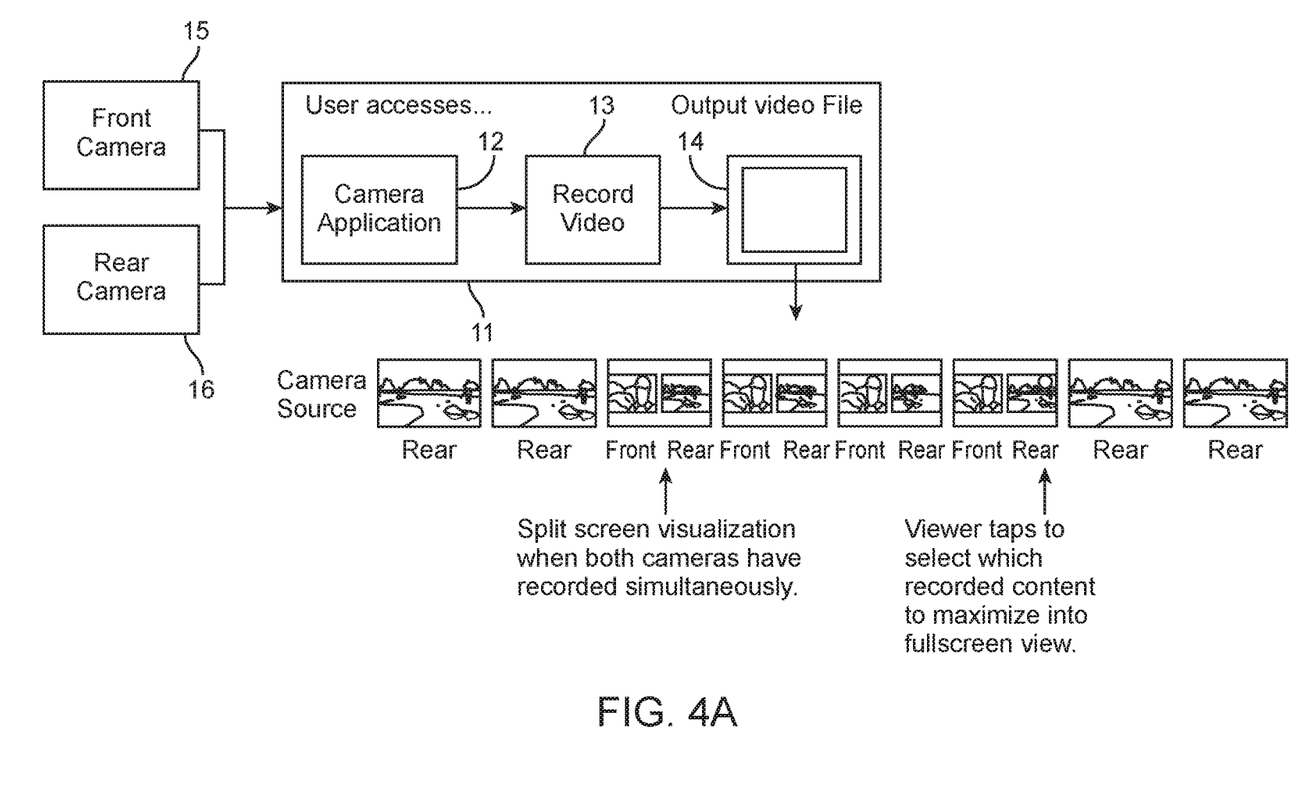
FIG. 4A shows a functional block diagram of a capturing module for continuous video capture during camera switch, according to another embodiment.

According to an embodiment, as shown in FIG. 4A, the camera source capture output displayed on the touch screen 21 comprises a video clip from the rear camera 16 and front camera 15 in split screen mode.

Figure 4B:
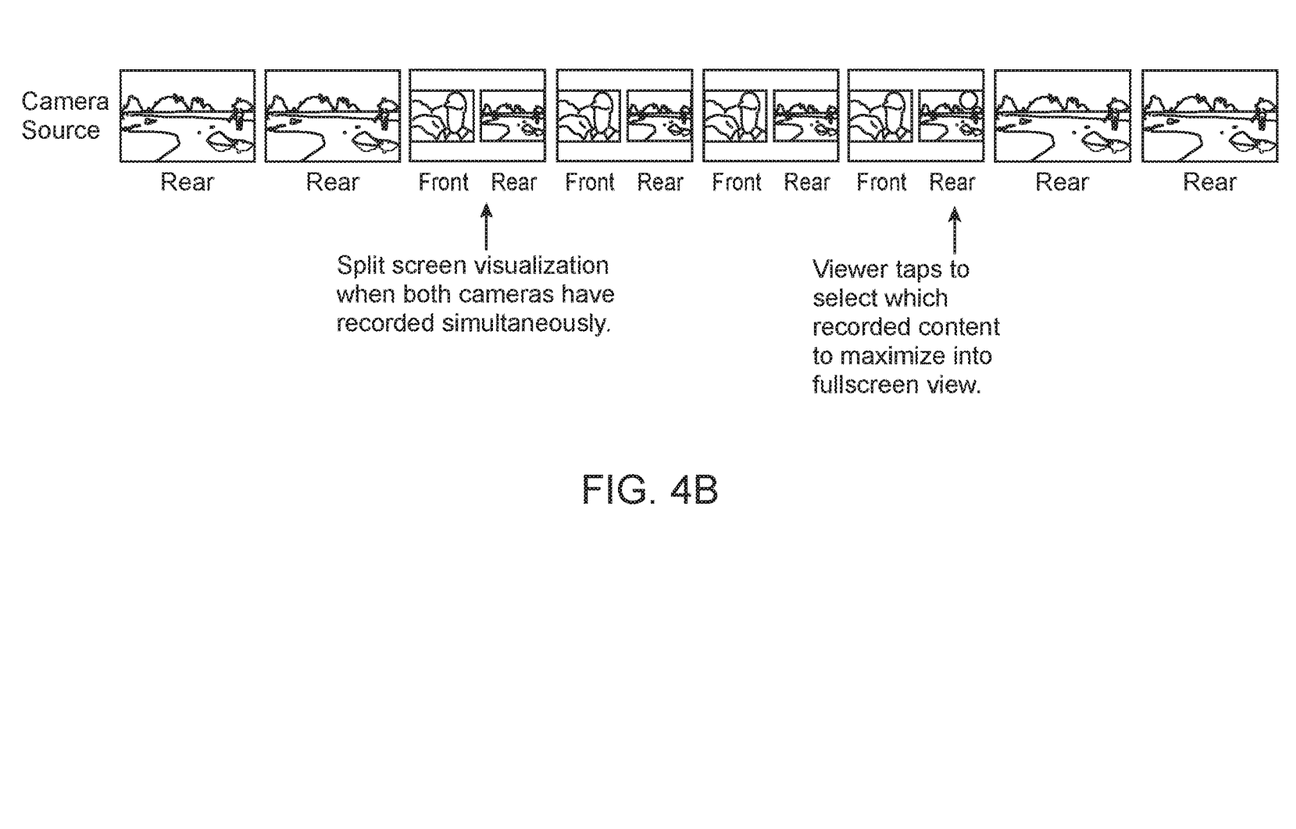
FIG. 4B shows example camera source output for continuous video capture during camera switch in FIG. 4A, according to an embodiment.

FIG. 4B shows the camera source output on the touch screen 21 in more detail. According to an embodiment, as shown in FIG. 4A, the camera source capture output displayed on the touch screen 21 comprises a video clip from the rear camera 16 and front camera 15 in split screen mode. FIG. 4B shows the camera source output on the touch screen 21 in more detail.

The user can further capture and record input from a first camera and a second camera simultaneously, by tapping an icon (e.g., thumbnail) in live view on the touch screen 21 which contains the feed from a non-active camera.

In another implementation, output displayed on the touch screen 21 comprises a video clip that is split screen whenever simultaneous recording takes place (with continuous sound). An output file comprises a format that allows the viewer to tap and select which camera recorded content the viewer would like to bring into full screen view.

Figure 5:
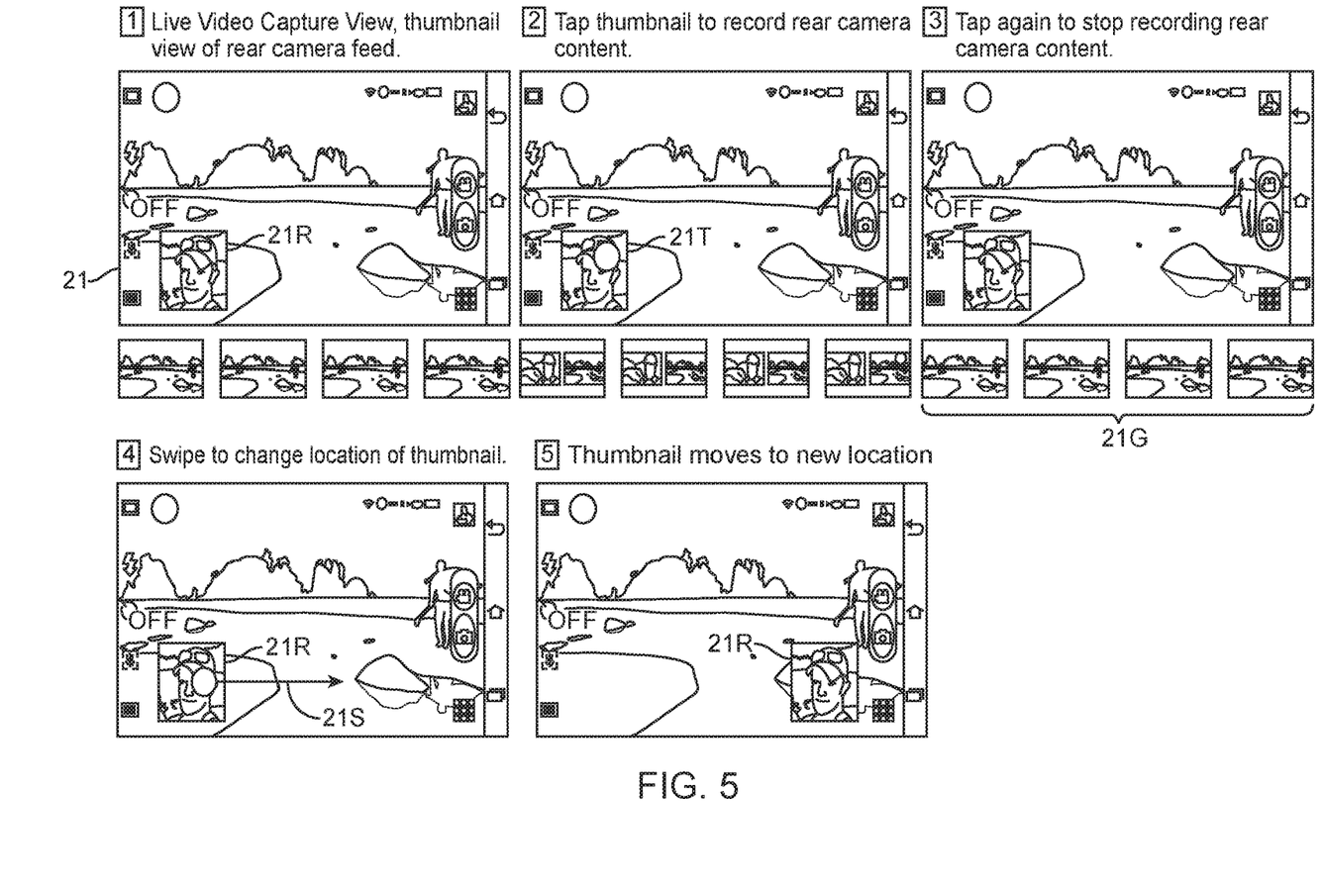
FIG. 5 shows an example process for the video information display by a capturing module in FIG. 4A, according to another embodiment.

FIG. 5 shows video output of simultaneous front and rear camera capture/recording, according to an embodiment. Screenshot 1 on touch screen 21 illustrates live video capture view of the front camera feed 21, including a thumbnail view 21R of the rear camera feed. Screenshot 2 illustrates a user tap 21T on thumbnail 21R on the touch screen 21 to record rear camera feed content (i.e., record from both front and rear cameras).

Screenshot 3 illustrates a user tap again to stop recording rear camera feed content. Screenshot 4 illustrates a user swipe 21S on the touch screen 21 to change the location of the rear camera feed thumbnail 21R. Screenshot 5 shows the location of the thumbnail 21R changed on the touch screen 21R. The thumbnails 21G at the bottom of each of the screen shots 1-3, indicate content being recorded to storage.

Figure 6:
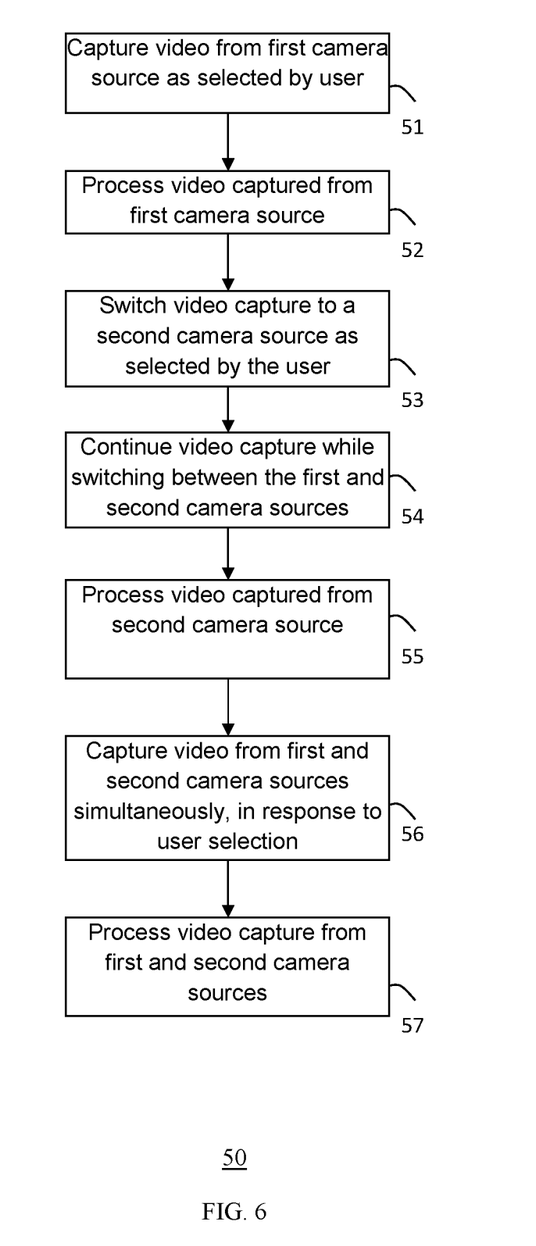
FIG. 6 shows a flowchart of a discovery process for continuous video capture during camera switch, according to an embodiment.

FIG. 6 shows a flowchart of a discovery process 50 for continuous video capture during camera switch, according to an embodiment. The process block 50 comprises:

Process block 51 comprises capturing video from a first camera source of a mobile device, in response to a selection by a user.

Process block 52 comprises processing the video captured from the first camera of the mobile device. In one implementation, the processing comprises displaying the video captured from the first camera source on a display of the mobile device. In one implementation, the processing comprises recording the video captured from the first camera source.

Process block 53 comprises switching video capture to a second camera source (from the first camera source) of the mobile device, in response to a selection by the user. The process block further comprises activating the second camera if non-active.

Process block 54 comprises continuing video capture while switching from the first camera source to the second camera source.

Process block 55 comprises processing the video captured from the second camera of the mobile device. In one implementation, the processing comprises displaying the video captured from the second camera source on the display of the mobile device. In one implementation, the processing comprises recording the video captured from the second camera source.

Process block 56 comprises capturing video from the first camera source and the second camera source simultaneously, in response to user selection.

Process block 57 comprises processing the video captured from the first camera source and the second camera source of the mobile device. In one implementation, the processing comprises displaying the video captured from the first and second camera sources as split screen (side-by-side) on the display of the mobile device. In another implementation, the processing comprises recording the video captured from the first and second camera sources. The recorded video can be played back.

In one embodiment, the process 50 is implemented by the video capture module 11. In one embodiment, the electronic device comprises a mobile electronic device capable of data communication over a communication link such as a wireless communication link. Examples of such mobile device include mobile phone device, mobile tablet device, etc. In one embodiment, the thumbnails on the display 21 are updated with relevant video information from corresponding camera feeds. A recording file format is utilized that allows a user to record one or more camera feeds simultaneously and toggling therebetween while viewing the recorded output. Whenever simultaneous multi-feed video recording is carried out, the output is automatically formatted in a video file format that embeds interactive properties.

Figure 7:
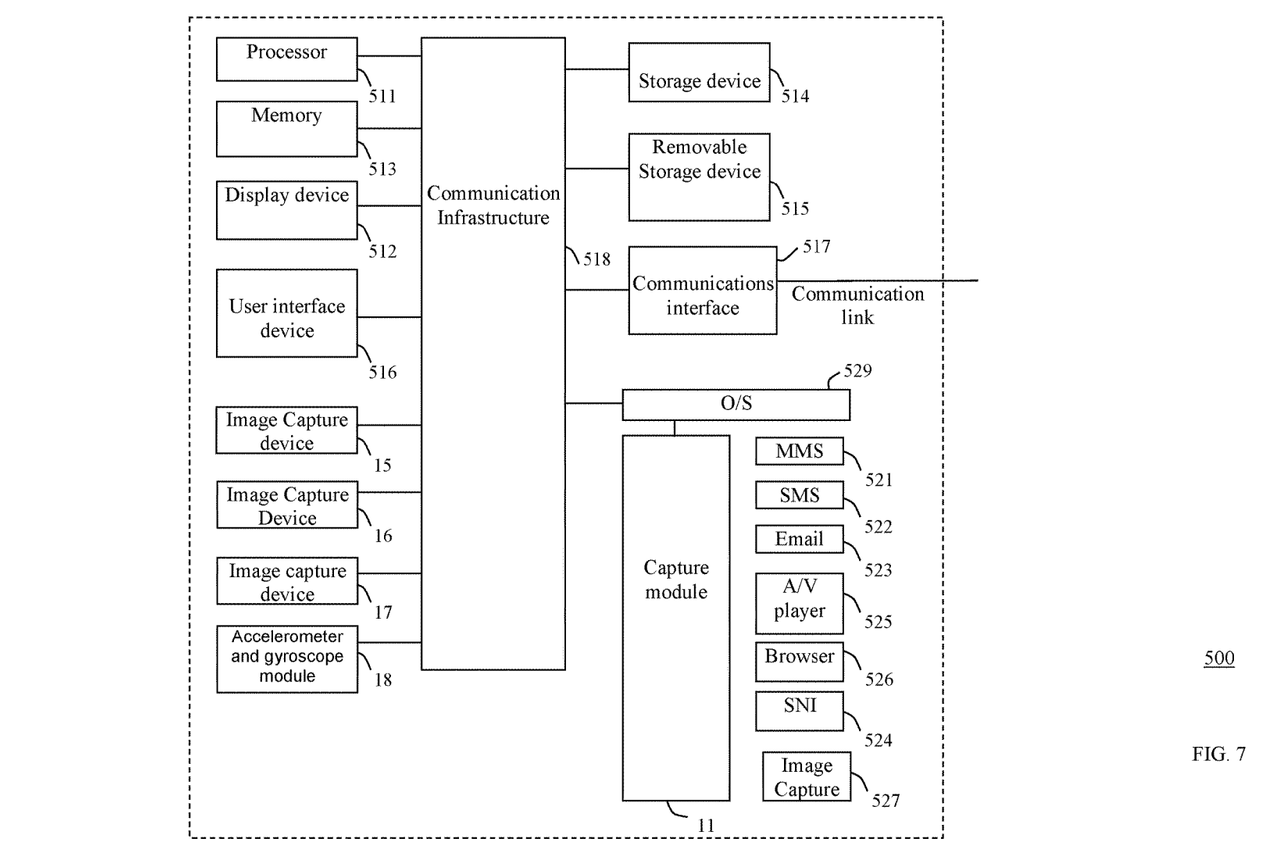
FIG. 7 is a high-level block diagram showing an information processing system comprising a computing system implementing an embodiment.

FIG. 7 is a high-level block diagram showing an information processing system comprising a computing system 500 implementing an embodiment. The system 500 includes one or more processors 511 (e.g., ASIC, CPU, etc.), and can further include an electronic display device 512 such as touch screen 21 in FIG. 1 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card).

The communication interface 517 allows software and data to be transferred between the computer system and external devices. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one or more embodiments, in a mobile wireless device such as a mobile phone, the system 500 further includes image capture device such as a cameras 15, 16 and 17. The system 500 may further include application modules as MMS module 521, SMS module 522, email module 523, social network interface (SNI) module 524, audio/video (AV) player 525, web browser 526, image capture module 527, etc.

The system 500 further includes a capture module 11 as described hereinabove, according to an embodiment. In one implementation, one or more components of the said capture module 11 may be implemented as executable code residing in a memory of the system 500. In another implementation, one or more components of the capture module 11 is in firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. An electronic device, comprising:
   a display;
   a first camera;
   a second camera; and
   a processor configured to:
      control the display to display video captured by the first camera based on a first user input;
      receive a second user input while video captured by the first camera is being displayed by the display;
      control the display to display both video captured by the first camera and video captured by the second camera based on the second user input;
      receive a third user input while both video captured by the first camera and video captured by the second camera are being displayed by the display;
      select one video from the video captured by the first camera and the video captured by the second camera based on the third user input, in order to display the selected video in a first display area of the display and display the other video in a second display area of the display, wherein a size of the first display area being larger than or be equal to a size of the second display area; and
      store video captured by the first camera and video captured by the second camera as a combined video in a single video file, wherein the single video file includes an embedded interactive property that provides for toggling between video captured by the first camera and video captured by the second camera during playback.

2. The electronic device of claim 1, wherein the first display area is a full screen view and the second display area is a thumbnail view.

3. The electronic device of claim 1, wherein the first camera is front camera and the second camera is rear camera.

4. The electronic device of claim 2, wherein the processor further configured to change location of the thumbnail based on a fourth user input.

5. The electronic device of claim 1, wherein the first display area and the second display area are disposed in a side-by-side screen format on the display.

6. A method of video display comprising:
   controlling, using a processor, a display to display video captured by a first camera based on a first user input;
   receiving a second user input while video captured by the first camera is being displayed by the display;
   controlling the display to display both video captured by the first camera and video captured by a second camera based on the second user input;
   receiving a third user input while both video captured by the first camera and video captured by the second camera are being displayed by the display; and
   selecting one video from the video captured by the first camera and the video captured by the second camera based on the third user input, in order to display the selected video in a first display area of the display and display the other video in a second display area of the display, wherein a size of the first display area being larger than or be equal to a size of the second display area; and
   storing video captured by the first camera and video captured by the second camera as a combined video in a single video file, wherein the single video file includes an embedded interactive property that provides for the toggling between video captured by the first camera and video captured by the second camera during playback.

7. The method of claim 6, wherein the first display area is a full screen view and the second display area is a thumbnail view.

8. The method of claim 6, wherein the video captured by the first camera is a forward facing video and the second camera is a rearward facing video in relation to the display.

9. The method of claim 7, further comprising
changing location of the thumbnail based on a fourth user input.

10. The method of claim 6, wherein the first display area and the second display area are disposed in a side-by-side screen format on the display.

11. A non-transitory computer readable medium with instructions thereon for execution by a processor of a method of video display comprising:
controlling, using a processor, a display to display video captured by a first camera based on a first user input;
receiving a second user input while video captured by the first camera is being displayed by the display;
controlling the display to display both video captured by the first camera and video captured by a second camera based on the second user input;
receiving a third user input while both video captured by the first camera and video captured by the second camera are being displayed by the display;
selecting one video from the video captured by the first camera and the video captured by the second camera based on the third user input, in order to display the selected video in a first display area of the display and display the other video in a second display area of the display, wherein a size of the first display area being larger than or be equal to a size of the second display area; and
storing video captured by the first camera and video captured by the second camera as a combined video in a single video file, wherein the single video file includes an embedded interactive property that provides for the toggling between video captured by the first camera and video captured by the second camera during playback.

12. The non-transitory computer readable medium of claim 11, wherein the first display area is a full screen view and the second display area is a thumbnail view.

13. The non-transitory computer readable medium of claim 12, further comprising changing location of the thumbnail based on a fourth user input.

14. The non-transitory computer readable medium of claim 11, wherein the first display area and the second display area are disposed in a side-by-side screen format on the display.

\* \* \* \* \*